United States Patent
Liu et al.

(10) Patent No.: US 9,414,292 B1
(45) Date of Patent: Aug. 9, 2016

(54) CONTROLLING DETECTION OF AN ACCESS NODE FOR WIRELESS DEVICE COMMUNICATION

(71) Applicant: Sprint Spectrum LP, Overland Park, KS (US)

(72) Inventors: Chunmei Liu, Great Falls, VA (US); Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 204 days.

(21) Appl. No.: 14/224,376

(22) Filed: Mar. 25, 2014

(51) Int. Cl.
*H04W 36/38* (2009.01)
*H04W 36/24* (2009.01)
*H04W 48/16* (2009.01)
*H04W 36/30* (2009.01)

(52) U.S. Cl.
CPC ............ *H04W 36/385* (2013.01); *H04W 36/24* (2013.01); *H04W 36/30* (2013.01); *H04W 48/16* (2013.01)

(58) Field of Classification Search
CPC ... H04W 36/22; H04W 36/38; H04W 36/385; H04W 36/30; H04W 72/04
See application file for complete search history.

(56) References Cited

U.S. PATENT DOCUMENTS

| | | | | |
|---|---|---|---|---|
| 5,878,328 A * | 3/1999 | Chawla | ................. | H04W 24/00 379/27.03 |
| 2007/0008941 A1* | 1/2007 | Narasimha | ............ | H04W 48/18 370/338 |
| 2009/0068970 A1* | 3/2009 | Ahmed | ................. | H04W 48/16 455/161.1 |
| 2009/0117891 A1* | 5/2009 | Chou | ................. | H04W 36/0088 455/423 |
| 2009/0149184 A1* | 6/2009 | Hohne | ................... | H04W 36/38 455/437 |
| 2009/0253392 A1* | 10/2009 | Colonna | ............... | G01S 5/0252 455/161.3 |
| 2010/0157864 A1* | 6/2010 | Salomone | ............. | H04W 48/16 370/311 |
| 2010/0267387 A1* | 10/2010 | Stephens | ................ | H04W 36/22 455/436 |
| 2011/0255516 A1* | 10/2011 | Pawar | ................... | H04W 36/30 370/332 |
| 2012/0051243 A1* | 3/2012 | Faye | ..................... | H04W 48/18 370/252 |
| 2012/0225628 A1* | 9/2012 | Ho | ......................... | G06N 3/126 455/115.1 |
| 2013/0210435 A1 | 8/2013 | Dimou et al. | | |
| 2014/0004841 A1* | 1/2014 | Morad | ................... | H04W 24/08 455/418 |

* cited by examiner

*Primary Examiner* — Omer S Mian

(57) ABSTRACT

In operation, it is determined that a wireless device is in communication with a first access node using a first frequency band, and that a first coverage area of the first access node includes at least a portion of a second coverage area of a second access node. A coverage proportion of the first coverage area which includes the portion of the second coverage area of the second access node is calculated, and based on the coverage proportion a scan interval is determined. In addition, based on the determined scan interval and an application requirement of an application running on the wireless device, a signal level criteria is determined. When a signal level of the first frequency band meets the signal level criteria the wireless device is instructed to scan for a second frequency band of the second access node using the scan interval.

14 Claims, 6 Drawing Sheets

CONTROLLING DETECTION OF AN ACCESS NODE FOR WIRELESS DEVICE COMMUNICATION

TECHNICAL BACKGROUND

Wireless devices and access nodes in a multi-frequency band wireless communication network may be capable of communication over a plurality of frequency bands. Different frequency bands may also be supported by different access nodes in the communication network. Wireless devices and access nodes can be configured to determine an access node for wireless device communication which can provide at least a threshold level of signal strength to the wireless device. A wireless device can scan for detectable access nodes and provide an indication when a signal of a detectable access node reaches the threshold level of signal strength. However, while the wireless device is scanning for other access nodes, the wireless device typically cannot send or receive data or control signaling.

OVERVIEW

In operation, it is determined that a wireless device is in communication with a first access node using a first frequency band, and that a first coverage area of the first access node includes at least a portion of a second coverage area of a second access node. A coverage proportion of the first coverage area which includes the portion of the second coverage area of the second access node is calculated, and based on the coverage proportion a scan interval is determined. In addition, based on the determined scan interval and an application requirement of an application running on the wireless device, a signal level criteria is determined. When a signal level of the first frequency band meets the signal level criteria the wireless device is instructed to scan for a second frequency band of the second access node using the scan interval.

DETAILED DESCRIPTION

Figure 1:
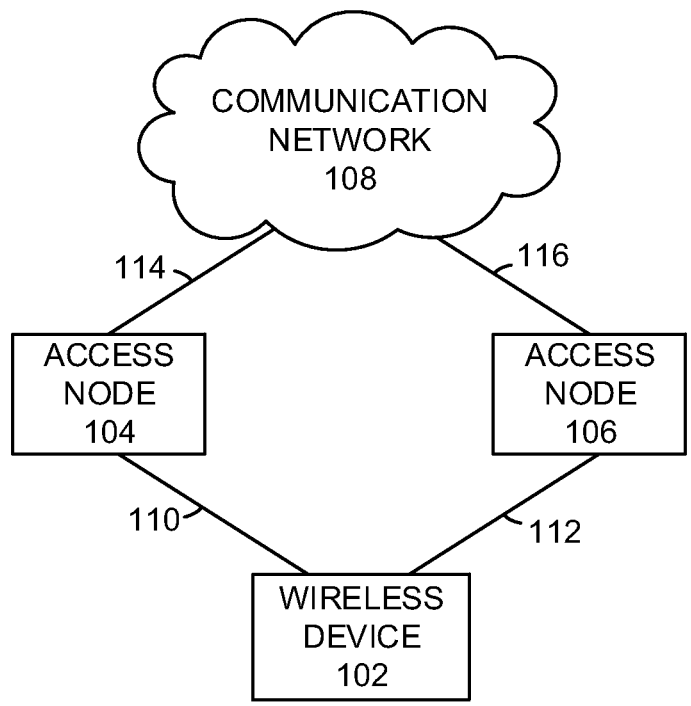
FIG. 1 illustrates an exemplary communication system to control detection of an access node.

FIG. 1 illustrates an exemplary communication system 100 to control detection of an access node comprising wireless device 102, access nodes 104 and 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110, and with access node 106 over communication link 112.

Access nodes 104 and 106 are each a network node capable of providing wireless communications to wireless device 102 and can be, for example, a base transceiver station, a radio base station, an eNodeB device, or an enhanced eNodeB device. Access node 104 is in communication with communication network 108 over communication link 114, and access node 106 is in communication with communication network 108 over communication link 116. In an embodiment, communications link 114 can comprise a first frequency band, and communication link 116 can comprise a second frequency band. Examples of a frequency band include 800 MHz, 1.9 GHz, 2.5 GHz, and the like. In operation, the first frequency band and the second frequency band comprise different frequency bands.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, and 116 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

When wireless device 102 is in communication with access node 104, wireless device 102 can measure a signal level of a frequency band over which wireless device 102 and access node 104 are in communication. For example, wireless device 102 can be in a radio resource connected mode (e.g., RR_C Connected mode, and the like) and can measure a signal level of a frequency band used to communicate with access node 104. The signal level can comprise a determination of a signal strength and/or a signal quality, such as a reference signal receive power (RSRP), a received signal strength indication (RSSI), a signal-to-noise ratio (SNR) value, a carrier to noise ratio (CNR) value, signal noise and distortion (SINAD), signal to interference (SII), signal to noise plus interference (SNIR), and signal to quantization noise ratio (SQNR), a reference signal receive quality (RSRQ), a channel quality indicator (CQI), and the like.

When the determined signal level meets a threshold, wireless device 102 can scan for other frequency bands, which may comprise a signal level superior to the signal level of access node 104. However, while wireless device 102 is scanning for another frequency band, data and/or signaling communication with access node 104 cannot occur, potentially interrupting ongoing communication, and potentially reducing data and/or signaling throughput between access node 104 and wireless device 102. Thus, the longer the scanning duration, the greater the chance that wireless device 102 may detect another frequency band, and the greater the reduction in data and/or signaling communication. Further, where the signal level of the first frequency band is large, even when wireless device 102 is close to access node 106, wireless device 104 may not be instructed to scan for a second frequency band provided by access node 106, and thus may not determine that the second frequency band is available.

In operation, it is determined that wireless device 102 is in communication with a first access node 104 using a first frequency band, and that a first coverage area of the first access node comprises at least a portion of a second coverage area of a second access node 106. Second access node 106 can comprise a coverage area which overlaps the coverage area of access node 104. The coverage area of access node 106 can also be completely within the coverage area of access node 104.

A coverage proportion is calculated of the first coverage area (i.e., of access node 104) which comprises the at least a portion of the second coverage area of second access node 106. Based on the coverage proportion, a scan interval is determined. In addition, application requirements of an application running on wireless device 102 are received, and a signal level criteria is determined based on the scan interval and the application requirements. When a signal level of the first frequency band meets the signal level criteria, wireless device 102 is instructed to scan for a second frequency band of second access node 106 using the scan interval.

Figure 2:
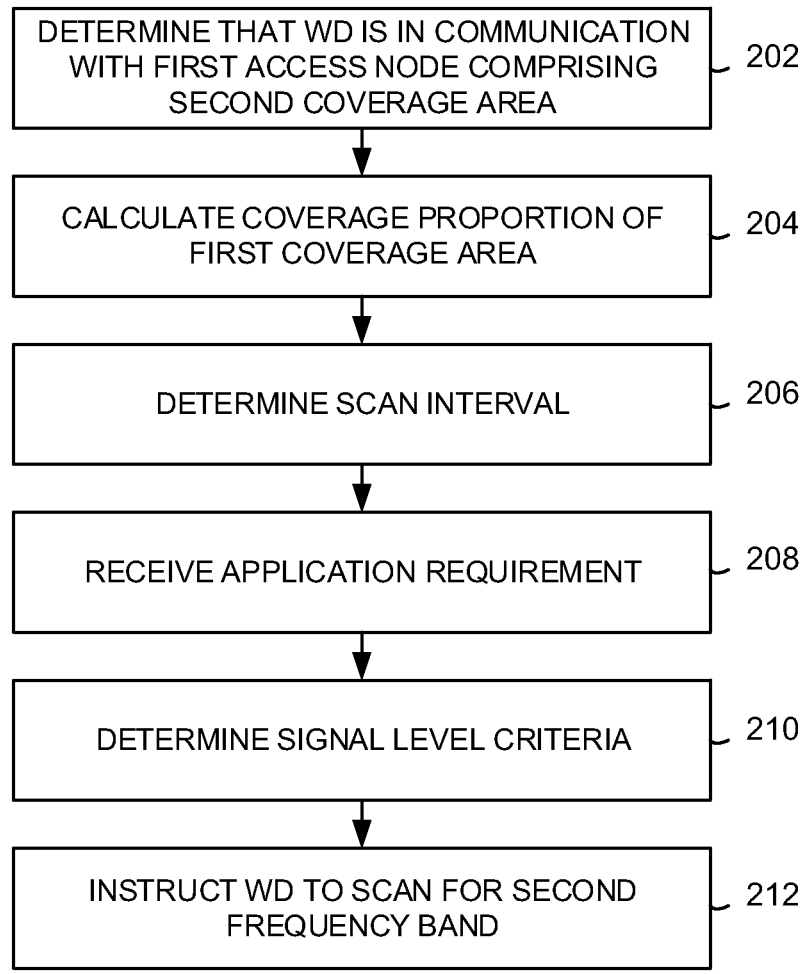
FIG. 2 illustrates an exemplary method of controlling detection of an access node.

FIG. 2 illustrates an exemplary method of controlling detection of an access node. In operation 202, it is determined that a wireless device is in communication with a first access node using a first frequency band, wherein a first coverage area of the first access node comprises at least a portion of a second coverage area of a second access node. For example, it can be determined that wireless device 102 is in communication with access node 104, and further that a coverage area of access node 104 comprises at least a portion of a coverage area of access node 106. Access node 104 can provide communications over a first frequency band, and access node 106 can provide communications over a second frequency band, which may be different than the first frequency band. Access node 104 can comprise, for example, a macro node or macro cell tower, and access node 106 can comprise a macro node, a micro node, a pico node, a femto node, and the like.

Figure 3:
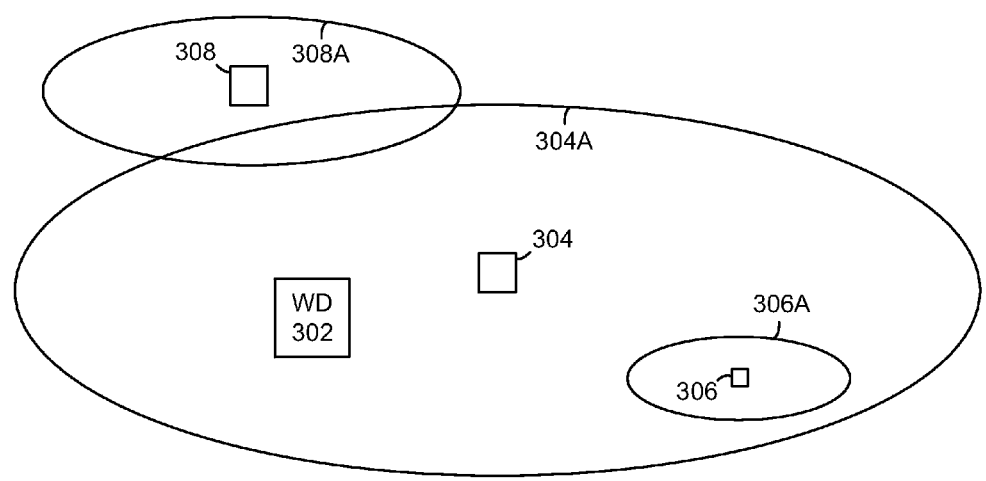
FIG. 3 illustrates exemplary access nodes.

A coverage proportion is calculated of the first coverage area which comprises the at least a portion of the second coverage area of the second access node (operation 204). For example, a proportion of the coverage area of access node 104 which overlaps with a coverage area of access node 106 can be determined. Referring to FIG. 3, wireless device 302 can be in communication with access node 304. Further, a coverage area 304A of access node 304 can overlap with one or more other coverage areas of other access nodes. For example, access node 306 can comprise coverage area 306A, which is completely within coverage area 304A. As another example, coverage area 308A of access node 308 can partially overlap coverage area 304A. Other examples are also possible. The illustration of three access nodes in FIG. 3 is merely exemplary, and in operation a system can comprise more or fewer access nodes.

Returning to FIG. 2, a scan interval is determined based on the coverage proportion (operation 206). The coverage proportion can represent a probability that a wireless device may detect a frequency band of another access node. For example, as wireless device 302 (FIG. 3) moves within coverage area 304A, it may move into coverage area 306A or coverage area 308A and may detect a frequency band supported by access node 306 or 308, respectively. Based on the determined coverage proportion, a scan interval can be determined for a wireless device. The scan interval can comprise an interval of time between scanning periods during which wireless device 304 scans for another frequency band. In an embodiment, the greater the coverage proportion, the smaller the scan interval based on the coverage proportion.

Referring again to FIG. 2, next, an application requirement is received of an application running on the wireless device (operation 208), and based on the scan interval and the application requirement a signal level criteria is determined (operation 210). The application requirement can comprise a minimum data rate, a maximum permitted data delay, a minimum throughput, a maximum error rate, a maximum data loss rate, and the like, of an application running on a wireless device. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like). The wireless device can also be evaluated based on its utilization or requested utilization of communication link resources, for example, an amount of data sent to or from the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. Further, the wireless device can be evaluated based on a traffic class indicator associated with bearer data being sent from the wireless device, such as a quality of service class indicator (QCI) or similar traffic class indicator. Moreover, the wireless device can be evaluated based on a level of priority provisioned within communication system 100 for the wireless device, such as may be associated with a premium-level subscriber, an emergency responder, and the like.

Based on the scan interval and the application requirement a signal level criteria is determined. The signal level criteria can comprise a signal level of the communication link between wireless device 102 and access node 104 (FIG. 1). The signal level criteria can also comprise a signal level of a communication link between wireless device 302 and access node 304 (FIG. 3).

It will be appreciated that the order of operations described above is exemplary and non-limiting, and that the order of certain operations may be performed without departing from the scope of the description. Further, certain operations may be combined or may be performed substantially simultaneously without departing from the scope of the description.

Returning to FIG. 2, when a signal level of the first frequency band meets the signal level criteria, the wireless device is instructed to scan for a second frequency band of the second access node using the scan interval (operation 212). For example, a signal level of communication link 110 (FIG. 1) can be monitored by wireless device 102, and when the signal level of the first frequency band used by wireless device 102 and access node 104 meets the signal level criteria, wireless device 102 can be instructed to scan for a second frequency band, such as the frequency band represented by communication link 112 supported by access node 106. As another example, signal level of communication link between wireless device 302 and access node 304 (FIG. 3) can be monitored by wireless device 302, and when the signal level of the first frequency band associated with that communication link meets the signal level criteria, wireless device 302 can be instructed to scan for a second frequency band, such as a frequency band supported by access node 306 or access node 308.

In an embodiment, access node 304 (FIG. 3) can comprise a macro node, and access nodes 306 and 308 can each comprise a smaller access node, such as a micro node, pico node, femto node, the like. Based the probability that wireless device 302 may detect a second frequency band supported by access node 306 or 308, wireless device 302 can be instructed to scan for the second frequency band more or less frequently, and criteria at which the scan may be initiated can also be determined based on both the determined scan interval and an application requirement of an application running on wireless device 302.

A higher signal level criteria may increase the amount of scanning for a second frequency band performed by a wireless device. The wireless device may therefore more readily detect a second frequency band supported by a second access node. A higher signal level criteria may also reduce throughput to and from the wireless device, when more time is allocated to scanning for the second frequency band. However, detection of the second frequency band may ultimately result in a higher throughput to and from the wireless device when the second access node is less congested, can provide a higher data rate, and the like. For example, when the second frequency band is detected, a handover may be performed to instruct the wireless device to change from communicating with the first access node to communicating with the second access node, which can provide a greater throughput to the wireless device.

Figure 4:
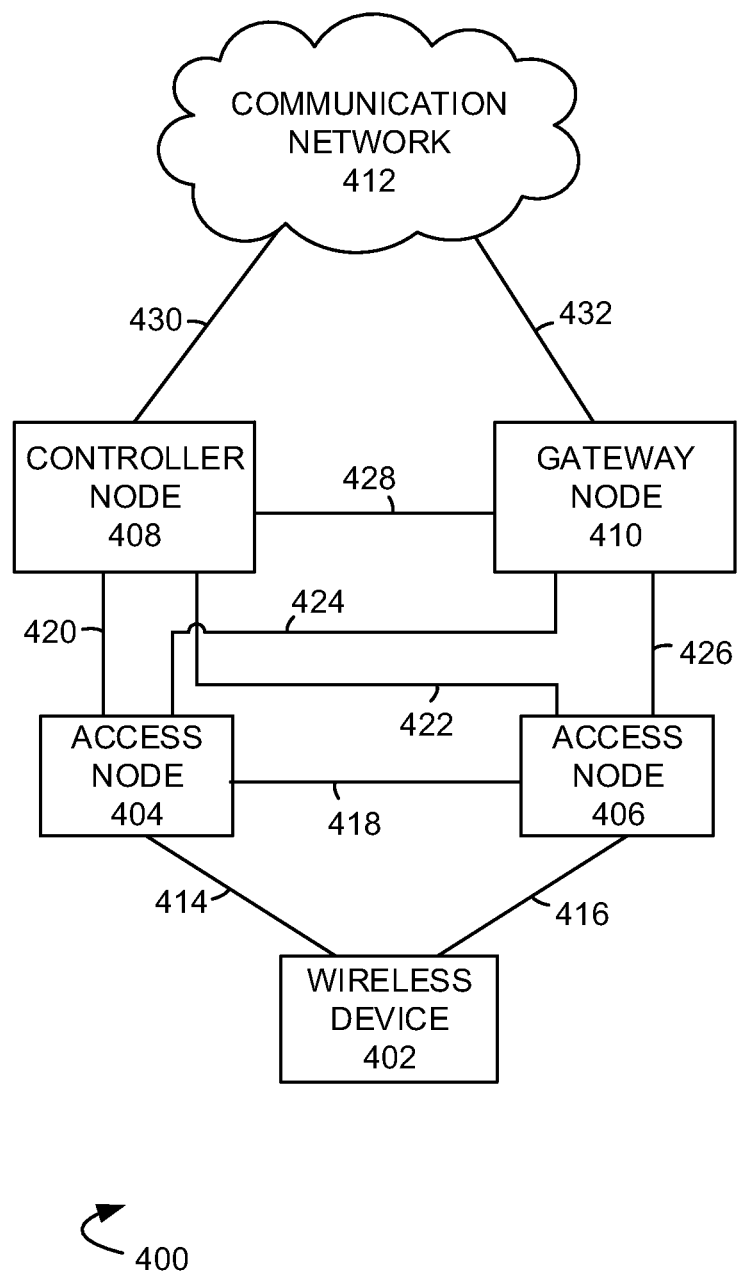
FIG. 4 illustrates another exemplary system to control detection of an access node.

FIG. 4 illustrates another exemplary system 400 to control detection of an access node comprising wireless device 402, access nodes 404 and 406, controller node 408, gateway node 410, and communication network 412. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication link 414, and with access node 406 over communication link 416.

Access nodes 404 and 406 are each a network node capable of providing wireless communications to wireless device 402 and can be, for example, a base transceiver station, a radio base station, an eNodeB device, or an enhanced eNodeB device. Access node 404 is in communication with controller node 408 over communication link 420, and with gateway node 410 over communication link 424. Access node 406 is in communication with controller node 408 over communication link 424, and with gateway node 410 over communication link 426. Access nodes 404 and 406 can also communicate with each other over communication link 418.

Controller node 408 can comprise a processor and associated circuitry to execute or direct the execution of computer-readable instructions, and can be configured to control the setup and maintenance of a communication session over communication network 412 for wireless device 402, as well as to maintain network connection information associated with wireless device 402. Controller node 408 can comprise a mobile switching center (MSC), a dispatch call controller (DCC), a mobility management entity (MME), or another similar network node. Controller node 408 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 is in communication with communication network 412 over communication link 430.

Gateway node 410 can comprise a processor and associated circuitry to execute or direct the execution of computer-readable instructions, and can be configured to maintain network connection information associated with wireless device 402. Gateway node 408 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 408 can receive instructions and other input at a user interface. Examples of gateway node 408 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 410 is in communication with controller node 408 over communication link 428, and with communication network 412 over communication link 432.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 can be capable of carrying voice information and other data, for example, to support communications by a wireless device such as wireless device 402. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV- DO rev. A, Worldwide Interoperability for Microwave Access (WiMAX), and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 412 may also comprise a wireless network, including base stations, wireless communication nodes, telephony switches, internet routers, network gateways, computer systems, communication links, or some other type of communication equipment, and combinations thereof.

Communication links 414, 416, 418, 420, 422, 424, 426, 428, 430, and 432 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404, access node 406, controller node 408, gateway node 410, and communication network 412 which are omitted for clarity, including additional processing nodes, routers, gateways, and physical and/or wireless data links for carrying data among the various network elements.

Figure 5:
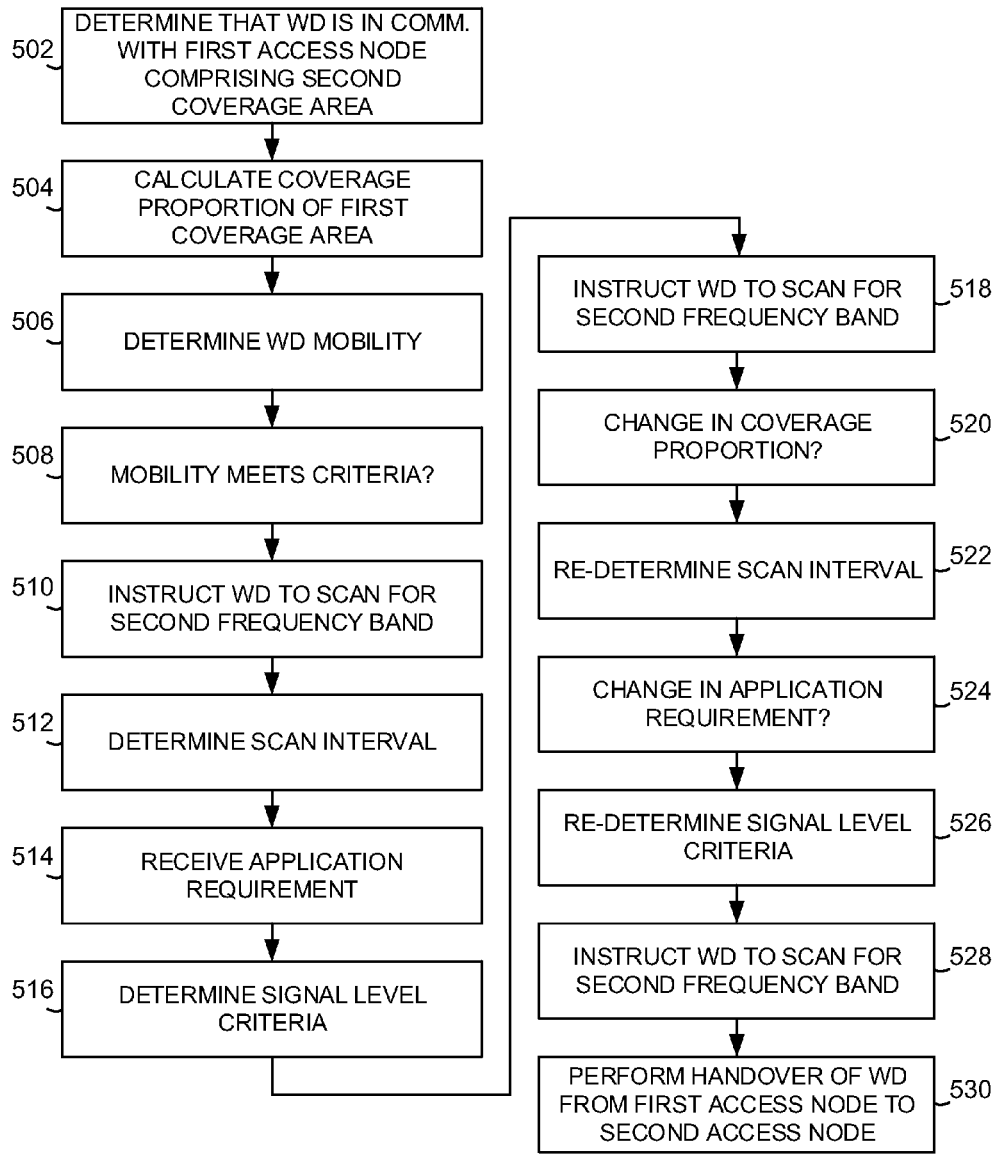
FIG. 5 illustrates another exemplary method of controlling detection of an access node interference.

FIG. 5 illustrates another exemplary method of controlling detection of an access node interference. In operation 502, it is determined that a wireless device is in communication with a first access node using a first frequency band, wherein a first coverage area of the first access node comprises at least a portion of a second coverage area of a second access node. For example, it can be determined that wireless device 402 is in communication with access node 404, and further that a coverage area of access node 404 comprises at least a portion of a coverage area of access node 406. Access node 404 can provide communications over a first frequency band, and access node 406 can provide communications over a second frequency band, which may be different than the first frequency band. Access node 404 can comprise, for example, a macro node or macro cell tower, and access node 406 can comprise a macro node, a micro node, a pico node, a femto node, and the like.

A coverage proportion is calculated of the first coverage area which comprises the at least a portion of the second coverage area of the second access node (operation 504). For example, a proportion of the coverage area of access node 404 which overlaps with a coverage area of access node 406 can be determined. Wireless device 402 can be in communication with access node 404. Further, a coverage area of access node 404 can overlap with one or more other coverage areas of other access nodes, such as a coverage area of access node 406. Access node 406 can comprise a coverage area which is completely within the coverage area of access node 404, or access node 406 can comprise a coverage area which partially overlaps the coverage area of access node 404. As one example, the coverage area of access node 404 can be represented as area A, and the area of overlap between the coverage areas of access node 404 and 406 can be represented as a. In such case, the coverage proportion can be expressed as a/A. As another example, referring to FIG. 3, coverage area 304A can be expressed as A, coverage area 306A can be expressed as a, and the portion of coverage area 308A which overlaps with coverage area 304A can be expressed as b. In such case, the coverage proportion can be expressed as a+b/A. Other examples are also possible. The coverage areas of each access node and the areas of coverage area overlap can be determined, for example, by a network element in communication system 400. The coverage areas of each access node and the areas of coverage area overlap can also be determined, for example, using information provided by wireless devices, which can determine received signal levels from the access nodes. Other examples are also possible.

Returning to FIG. 5, in operation 506, a mobility of the wireless device is determined. The mobility can comprise, for example, a determination of a location of wireless device 402 over time. The location can be determined relative to access node 404, and the location can be determined based on location information such as GPS data, base station triangulation, and the like. Based on the location over time, a speed and/or direction of wireless device 402 can be determined.

It can be determined whether the mobility of the wireless device meets a mobility criteria (operation 508). The mobility criteria can comprise, for example, a threshold level of mobility. In an embodiment, a mobility of wireless device 402 can be considered to meet the mobility criteria when the mobility meets or is below the threshold level of mobility. When the mobility of the wireless device meets the mobility criteria the wireless device can be instructed to scan for the second frequency band (operation 510). For example, when it is determined that wireless device 402 is substantially stationary (as one example of a mobility meeting the mobility criteria), wireless device 402 can be instructed to scan for a second frequency band supported by access node 406.

In operation 512, a scan interval is determined based on the coverage proportion. The coverage proportion can represent a probability that a wireless device may detect a frequency band of another access node. For example, as wireless device 402 moves within the coverage area of access node 404, it may move into a coverage area of access node 406, and may detect a frequency band supported by access node 406. Based on the determined coverage proportion, a scan interval can be determined for a wireless device. The scan interval can comprise an interval of time between scanning periods during which wireless device 404 scans for another frequency band. In an embodiment, the greater the coverage proportion, the smaller the scan interval based on the coverage proportion. The scan interval can be determined to varying degrees of granularity. For example, the scan interval can be determined as a multiple of an interval of time (e.g., 1*40 ms, 2*40 ms, etc.). The scan interval can also be determined as any interval of time within a range (e.g., between 1 ms and 500 ms). The scan interval can also be determined as a selection from among a predetermined set of scan intervals (e.g., selecting from among a 40 ms interval, an 80 ms interval, and the like). Other examples are also possible, including combinations thereof.

Next, an application requirement is received of an application running on the wireless device (operation 514). The application requirement can comprise a minimum data rate, a maximum permitted data delay, a minimum throughput, a maximum error rate, a maximum data loss rate, and the like, of an application running on a wireless device. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like). The wireless device can also be evaluated based on its utilization or requested utilization of communication link resources, for example, an amount of data sent to or from the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. Further, the wireless device can be evaluated based on a traffic class indicator associated with bearer data being sent from the wireless device, such as a quality of service class indicator (QCI) or similar traffic class indicator. Moreover, the wireless device can be evaluated based on a level of priority provisioned within communication system 400 for the wireless device, such as may be associated with a premium-level subscriber, an emergency responder, and the like.

Based on the scan interval and the application requirement a signal level criteria is determined (operation 516). The signal level criteria can comprise a signal level of a communication link between wireless device 402 and access node 404 using a first frequency band. When a signal level of the first frequency band meets the signal level criteria, the wireless device is instructed to scan for a second frequency band of the second access node using the scan interval (operation 518). For example, a signal level of the first frequency band can be monitored by wireless device 402, and when the signal level of the first frequency band used by wireless device 402 and access node 404 meets the signal level criteria, wireless device 402 can be instructed to scan for a second frequency band, such as may be supported by access node 406.

As one example, it can be determined that the coverage proportion is 80% (i.e., that a coverage area of one or more second access nodes overlaps 80% of the coverage area of the first access node) and that a wireless device is running an email application, which can be considered as having a relatively low application requirement or being a latency insensitive application. The determined scan interval will be relatively larger because of the relatively high probability of the wireless device entering a coverage area of a second access node, and because the impact on throughput to and from the wireless device will be relatively low where the application requirement is relatively low. For example, the signal level criteria can be expressed as a signal level, and the signal level of the first frequency band can be considered to meet the signal level criteria when the signal level is at or below the signal level of the signal level criteria.

As another example, it can be determined that the coverage proportion is 5% (i.e., that a coverage area of one or more second access nodes overlaps 5% of the coverage area of the first access node) and that a wireless device is running a streaming video application, which can be considered as having a relatively high application requirement or being a latency sensitive application. The determined scan interval will be relatively smaller because of the relatively low probability of the wireless device entering a coverage area of a second access node, and because the impact on throughput to and from the wireless device will be relatively high where the application requirement is relatively high.

A change in the coverage proportion can be determined (operation 520). For example, access node 406 may perform signal boosting, such as transmitting a pilot signal, a reference signal, or an equivalent signal with an increased power level. As another example of signal boosting, access node 406 may perform cell range expansion (CRE) or the equivalent. Further, a new access node may be activated within the coverage area of access node 404. In such cases, it can be determined that a coverage area of access node 404 comprising at least a portion of a coverage area of access node 406 has increased. Further, access node 406 can cease signal boosting, or performing CRE, or access node 406 may be powered down, may experience a service disruption, and the like. In such cases, it can be determined that a coverage area of access node 404 comprising at least a portion of a coverage area of access node 406 has decreased.

When the coverage proportion is determined to have changed, a scan interval is re-determined based on the changed coverage proportion (operation 522). The re-determined coverage proportion can represent a probability that a wireless device may detect a frequency band of another access node in the changed coverage proportion. The re-determined scan interval can comprise an interval of time between scanning periods during which wireless device 404 scans for another frequency band.

It can further be determined that the application requirement of the wireless device has changed (operation 524). For example, wireless device 402 can change from running a first application to running a second application. The second application may have greater or lesser requirements that the first application, such as a greater or lesser minimum data rate, a maximum permitted data delay, a minimum throughput, a maximum error rate, a maximum data loss rate, and the like. The second application can also comprise a more or less delay sensitive application, and/or the second application can comprise a greater or lesser utilization or requested utilization of communication link resources, for example, an amount of data sent to or from the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. Further, the second application requirement can reflect a greater or lesser traffic class indicator associated with bearer data being sent from the wireless device, such as a quality of service class indicator (QCI) or similar traffic class indicator.

Based on the re-determined scan interval and/or the changed application requirement a signal level criteria is re-determined (operation 528). The re-determined signal level criteria can comprise a signal level of a communication link between wireless device 402 and access node 404 using a first frequency band. When a signal level of the first frequency band meets the re-determined signal level criteria, the wireless device is instructed to scan for a second frequency band of the second access node using the scan interval (operation 528). For example, a signal level of the first frequency band can be monitored by wireless device 402, and when the signal level of the first frequency band used by wireless device 402 and access node 404 meets the signal level criteria, wireless device 402 can be instructed to scan for a second frequency band, such as may be supported by access node 406.

In operation 530, when a signal level of the second frequency band meets a second signal level criteria, a handover is performed of the wireless device from communicating with the first access node to communicating with the second access node. For example, when a signal level of the second frequency band supported by access node 406 is greater than the signal level of the first frequency band supported by access node 404, wireless device 402 may be handed over from access node 404 to access node 406. In an embodiment, the handover of wireless device 402 is performed when the signal level of the second frequency band is greater than a threshold signal level above the signal level of the first frequency band.

It will be appreciated that the order of operations described above is exemplary and non-limiting, and that the order of certain operations may be performed without departing from the scope of the description. Further, certain operations may be combined or may be performed substantially simultaneously without departing from the scope of the description.

Figure 6:
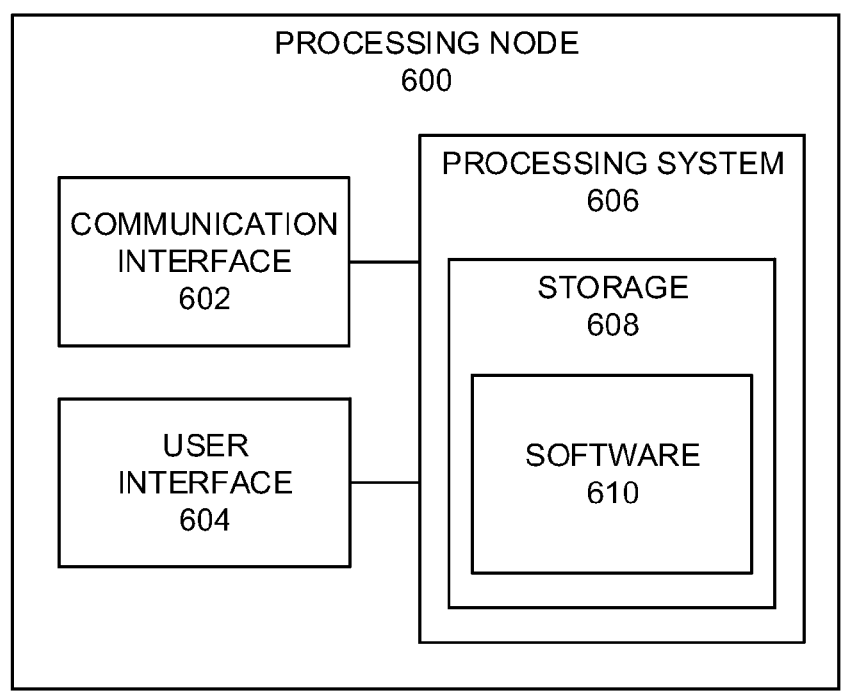
FIG. 6 illustrates an exemplary processing node.

FIG. 6 illustrates an exemplary processing node 600 comprising communication interface 602, user interface 604, and processing system 606 in communication with communication interface 602 and user interface 604. Processing node 600 can be configured to control detection of an access node for wireless device communication. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, access node 106, access node 404, access node 406, controller node 408, and gateway node 410. Processing node 600 can also be an adjunct or component of a network element, such as an element of access nodes 104, 106, 404, or 406, controller node 408, or gateway node 410. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of controlling detection of an access node for wireless device communication, comprising:
   determining, by a controller in communication with at least a first access node, that a wireless device is in communication with the first access node using a first frequency band, wherein a first coverage area of the first access node comprises at least a portion of a second coverage area of a second access node, the second access node different from the first access node;
   calculating, by the controller, a coverage proportion of the first coverage area comprising the at least a portion of the second coverage area of the second access node;
   determining an increase in a scan interval based on a decrease in the coverage proportion and a decrease in the scan interval based on an increase in the coverage proportion, the scan interval being a time between scanning periods during which the wireless device scans for a frequency band other than the first frequency band;
   receiving an application requirement of an application running on the wireless device;
   determining a signal level criteria based on the scan interval and the application requirement; and
   instructing by the controller, the wireless device to scan for a second frequency band of the second access node using the scan interval when a signal level of the first frequency band meets the signal level criteria.

2. The method of claim 1, further comprising performing a handover of the wireless device from communicating with the first access node to communicating with the second access node when a signal level of the second frequency band meets a second signal level criteria.

3. The method of claim 1, wherein as the application requirement increases the signal level criteria increases.

4. The method of claim 1, further comprising:
   determining that the coverage proportion has changed; and
   re-determining the scan interval based on the changed coverage proportion.

5. The method of claim 1, further comprising:
   determining that the application requirement has changed;
   re-determining the signal level criteria based on the changed application requirement and the scan interval.

6. The method of claim 1, further comprising:
   determining a mobility of the wireless device; and determining the scan interval based on the coverage proportion and the mobility of the wireless device.

7. The method of claim 6, further comprising:
determining that the mobility of the wireless device meets a mobility criteria; and
instructing the wireless device to scan for the second frequency band of the second access node using the scan interval when the mobility of the wireless device meets the mobility criteria.

8. A system of controlling detection of an access node for wireless device communication, comprising:
a processing node configured to:
determine that a wireless device is in communication with a first access node using a first frequency band, wherein a first coverage area of the first access node comprises at least a portion of a second coverage area of a second access node, the second access node different from the first access node;
calculate a coverage proportion of the first coverage area which comprises the at least a portion of the second coverage area of the second access node;
determine an increase in a scan interval based on a decrease in the coverage proportion and a decrease in the scan interval based on an increase in the coverage proportion, the scan interval being a time between scanning periods during which the wireless device scans for a frequency band other than the first frequency band;
receive an application requirement of an application running on the wireless device;
determine a signal level criteria based on the scan interval and the application requirement; and
instruct the wireless device to scan for a second frequency band of the second access node using the scan interval when a signal level of the first frequency band meets the signal level criteria.

9. The system of claim 8, wherein the processing node is further configured to perform a handover of the wireless device from communicating with the first access node to communicating with the second access node when a signal level of the second frequency band meets a second signal level criteria.

10. The system of claim 8, wherein as the application requirement increases the signal level criteria increases.

11. The system of claim 8, wherein the processing node is further configured to: determine that the coverage proportion has changed; and re-determine the scan interval based on the changed coverage proportion.

12. The system of claim 8, wherein the processing node is further configured to:
determine that the application requirement has changed;
re-determine the signal level criteria based on the changed application requirement and the scan interval.

13. The system of claim 8, wherein the processing node is further configured to: determine a mobility of the wireless device; and determine the scan interval based on the coverage proportion and the mobility of the wireless device.

14. The system of claim 13, wherein the processing node is further configured to: determine that the mobility of the wireless device meets a mobility criteria; and instruct the wireless device to scan for the second frequency band of the second access node using the scan interval when the mobility of the wireless device meets the mobility criteria.

* * * * *